United States Patent
Rosen et al.

(10) Patent No.: US 7,752,551 B2
(45) Date of Patent: Jul. 6, 2010

(54) METHOD AND APPARATUS FOR BUILDING AN APPLICATION INTERFACE

(75) Inventors: Alexander D. Rosen, Somerville, MA (US); Paul H. DiCristina, Arlington, MA (US)

(73) Assignee: Novell, Inc., Provo, UT (US)

( * ) Notice: Subject to any disclaimer, the term of this patent is extended or adjusted under 35 U.S.C. 154(b) by 2058 days.

(21) Appl. No.: 10/434,282

(22) Filed: May 9, 2003

(65) Prior Publication Data
US 2003/0234816 A1    Dec. 25, 2003

Related U.S. Application Data

(63) Continuation of application No. 09/595,575, filed on Jun. 14, 2000, now Pat. No. 6,563,522, which is a continuation of application No. 09/076,926, filed on May 12, 1998, now Pat. No. 6,097,382.

(51) Int. Cl.
*G06F 3/00* (2006.01)
(52) U.S. Cl. .............. 715/748; 715/769; 715/968; 715/749; 715/766
(58) Field of Classification Search .......... 715/506, 715/507, 533, 748, 769, 968, 749, 766
See application file for complete search history.

(56) References Cited

U.S. PATENT DOCUMENTS

| | | | | |
|---|---|---|---|---|
| 4,710,763 A | * | 12/1987 | Franke et al. | 340/723 |
| 5,193,183 A | * | 3/1993 | Bachman | 707/1 |
| 5,262,761 A | * | 11/1993 | Scandura et al. | 340/133 |
| 5,546,529 A | * | 8/1996 | Bowers et al. | 395/159 |
| 5,559,945 A | * | 9/1996 | Beaudet et al. | 395/156 |
| 5,615,367 A | * | 3/1997 | Bennett et al. | 395/613 |
| 5,630,125 A | | 5/1997 | Zellweger | 707/103 R |
| 5,694,608 A | * | 12/1997 | Shostak | 715/506 |
| 5,802,514 A | * | 9/1998 | Huber | 707/4 |
| 5,874,965 A | * | 2/1999 | Takai et al. | 345/357 |
| 6,185,560 B1 | | 2/2001 | Young et al. | 707/6 |

OTHER PUBLICATIONS

Robert Cowart, "Mastering Windows 3.1 Special Edition", SYBEX, pp. 105 and 112, 1993.*
Microsoft Corporation, © 1986-1996, Microsoft Corporation, Access 97, SR-2, Program documentation help index, no pages—indexed by subject headings.

* cited by examiner

*Primary Examiner*—Simon Ke
(74) *Attorney, Agent, or Firm*—Pillsbury Winthrop Shaw Pittman LLP

(57) ABSTRACT

Embodiments of the invention comprise a design tool for designing an application interface. The design tool includes a graphical user interface (GUI) that visually represents a hierarchy of data and the relationships between the data. Thus, the design tool eliminates the need for an interface designer to have independent knowledge of the structure of the data (i.e., the data fields and relationships between the data). The design tool's GUI represents the data and the relationships between the data in a hierarchical display referred to as a data palette. An output hierarchy comprised of output levels is created as the user selects fields from the data palette to be displayed in the application's interface. When a data field is selected, the design tool automatically determines the appropriate interface component and output level of the output hierarchy using the relationships defined for the data. Output levels are associated with interface components that comprise the application's interface. Examples of interface components that can be used in the application's interface include a form, view and subband.

18 Claims, 11 Drawing Sheets

Figure 3A:
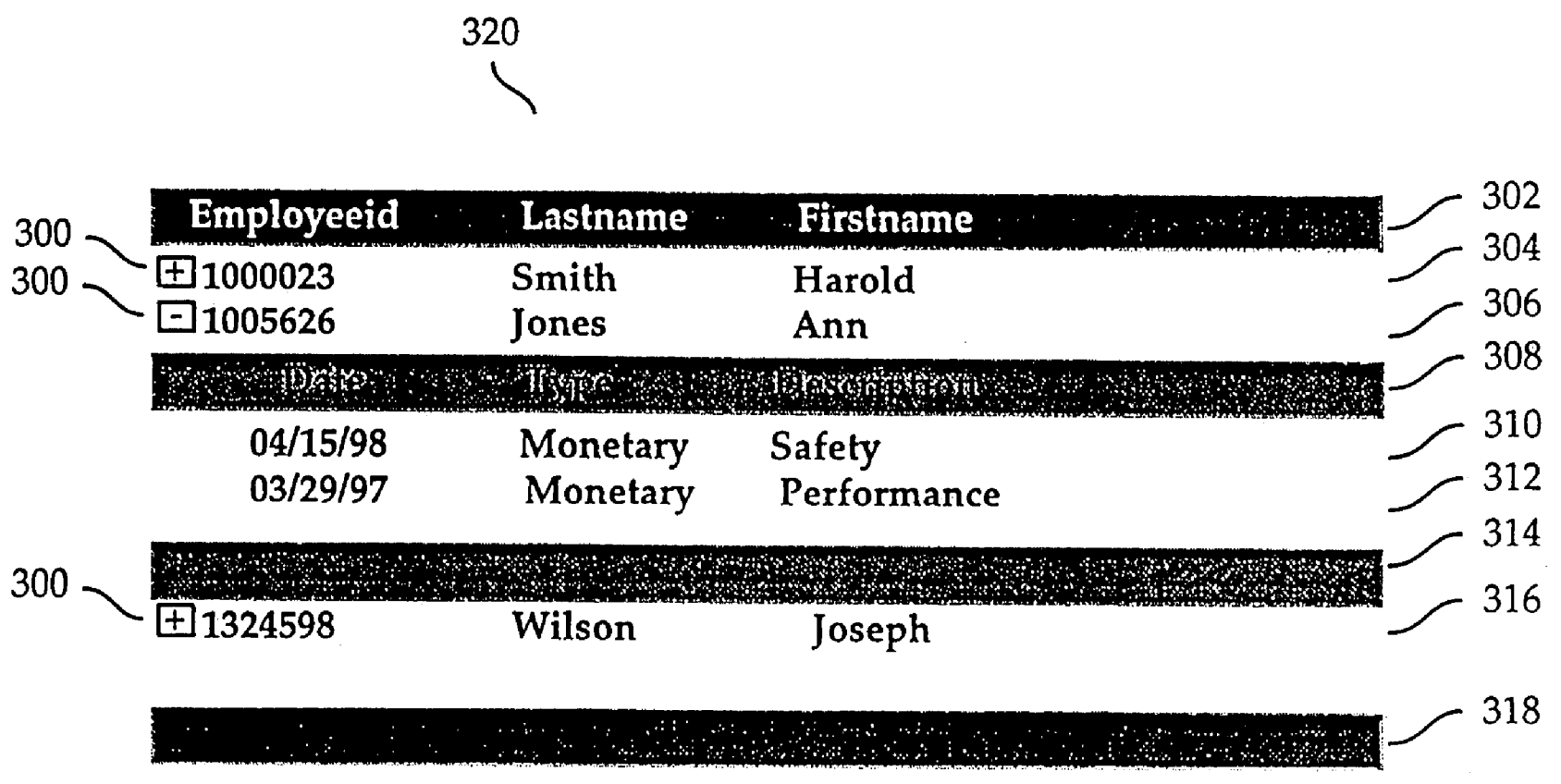

| Employeeid | Lastname | Firstname | | | Type | | | |
|---|---|---|---|---|---|---|---|---|
| ⊞ 1000023 | Smith | Harold | | | | | | |
| ⊟ 1005626 | Jones | Ann | | | | | | |
| | | | 04/15/98 | | Monetary | Safety | | |
| | | | 03/29/97 | | Monetary | Performance | | |
| ⊞ 1324598 | Wilson | Joseph | | | | | | |

METHOD AND APPARATUS FOR BUILDING AN APPLICATION INTERFACE

CROSS-REFERENCE TO RELATED APPLICATIONS

This application is a continuation of U.S. patent application Ser. No. 09/595,575, entitled "Method and Apparatus for Building an Application Interface," filed Jun. 14, 2000, which issued as U.S. Pat. No. 6,563,522 on May 13, 2003, and which is a continuation of U.S. patent application Ser. No. 09/076,926, entitled "Method and Apparatus for Building an Application Interface," filed May 12, 1998, which issued as U.S. Pat. No. 6,097,382 on Aug. 1, 2000, the contents of which are hereby incorporated by reference in their entirety.

BACKGROUND OF THE INVENTION

1. Field of the Invention

This invention relates to the manipulation of hierarchical information in a computer system, and more specifically to building an application interface using hierarchical information.

2. Background Art

Software applications designed to run on computer systems allow an application user to manipulate data associated with an application. For example, an accounting application allows a user to manipulate accounting information. A graphical user interface (GUI) is typically designed for a software application that allows an application user to enter and update application data.

Design tools are available that assist an application software developer in designing an application's GUI. However, design tools that are currently available require that the application developer be aware of relationships that exist in the application data.

For example, application data can be managed by a database management system (DBMS) such as a relational database management system (RDBMS). In an RDBMS, data is stored in tables that can be interrelated.

A table can contain multiple rows of data where each row contains one or more fields or columns. Each column contains an item of data. For example, an employee table contains rows of employee records. Each row, or record, contains information regarding an employee. An employee record can contain, for example, a last name column that contains a last name of the employee.

Data stored in a column (or columns) of a table can form the basis for a relationship between that table and another table in the database having a related column (or columns). Using a relationship between columns of two tables, it is possible to join these two tables to provide a single table of information that contains instances of rows from one table combined with related rows from the other table.

Tables may be related via one-to-one, one-to-many, or many-to-one relationships. In a one-to-one relationship, one row in one table is related to a single row in a second table and vice versa. For example, a row in an employee table that contains information about an employee relates to a salaries table that contains the employee's salary information. Since an employee is typically only earning a single salary, there is a one-to-one relationship between an employee's employee table record and the employee's salary table record.

In a one-to-many relationship, a row in one table may be related to many rows in a second table, but each row in the second table matches only one row in the first table. For example, a state table that contains a state identifier and a state name can be related to multiple rows in the employee table. However, a row in the employees table identifies only one state of residence, for example. Conversely, a many-to-one relationship exists where many rows in one table match only one row in a second table, but each row in the second table may match many rows in the first table.

To relate two tables, it is necessary to identify one or more columns that are common to both tables. These columns are typically referred to as keys. A primary key is a unique key within a table and uniquely identifies a row within the table. A foreign key in a second table is comprised of the column(s) containing a first table's primary key information. For example, in the employee table, an employee identifier (employeeID) can be assigned to uniquely identify each employee. The employeeID can be used as a primary key for the employees table. The employeeID can also be used as a foreign key in the salaries table. The employees and salaries tables can be joined by the employeeID columns in each table to have information from both tables available in a single record.

Applications are developed to provide a user with the ability to facilitate access and manipulation of the data contained in a DBMS. A DBMS includes a Data Manipulation Language (DML) such as Structured Query Language (SQL). A DML provides set-oriented relational operations for manipulating data in the DBMS. However, a DML requires a precise syntax that must be used to access and manipulate DBMS data. To use a DML, a user must understand and use the DML's syntax. Instead of requiring each user that wishes to modify data stored in a DBMS to learn the DML's syntax, applications are written that provide an interface between the user and a DBMS' DML. For example, a personnel application provides an interface to allow an employee in the personnel department to view and update employee information.

A database application typically includes a graphical user interface (GUI) that is comprised of presentation elements such as a form. A form is a self-contained presentation element with predefined areas for displaying, entering and/or changing data. The predefined areas are typically referred to as fields.

Fields in a form can be read-only (e.g., a label field). A form can also have fields in which information is displayed and the user can enter information. For example, in an operation to modify an employee's last name, a text field can be used to display the name currently stored in the database and allow the user to overwrite the display to enter the employee's new last name. When user submits the information, the application can retrieve the user input and update the database accordingly.

To populate the fields in a form, the application developer must associate fields in the database with fields in the form. This process is typically referred to as binding database fields with form fields. In a simple example of a form, the fields contained within the form are bound to fields in a single table.

A form can be more complicated where fields receive data from multiple tables. The application developer designing a form must be aware of the relationship(s) that exist between the tables that are to be bound to the fields in the form. If, for example, the form contains fields from tables that are related via a one-to-many relationship, the application developer must design the form the accommodate multiple rows of information. For example, a form that displays a department and its joblistings (which are related via a one-to-many relationship) must be able to display the department information as well as multiple joblistings for that department. The form must be designed to display the department and include multiple rows to display the joblistings for the department, for example.

The relationship between the department and joblistings tables is a one-to-many relationship. That is, there can be many joblistings for a given department. The format of the display of information related by a one-to-many relationship is different than that used to display information related by either a many-to-one or one-to-one relationship.

For example, the employees, salaries and state tables are related to each other via many-to-one (e.g., more than one employee can reside in the same state) and one-to-one relationship (e.g., each employee has a salary). Since a row in the employees table is related to a single row in state and salaries tables, the developer can design a form with fields that display information about an employee taken from these three tables. For example, the form can contain fields to display the employee's name, state of residence and salary.

Thus, it can be seen that the design of a form depends on the type of relationships that exist between the tables. Using existing interface design tools, the application developer has been required to have knowledge of these relationships. The application developer must be aware of the structure of a database including the tables, the columns within a table and the relationships between tables. For example, an application developer that is building a form to display output retrieved from a database must associate fields in the form with columns in the database. If the form includes columns from multiple tables, the developer must be aware of the relationships that exist between the tables which includes the type of relationship.

One example of such a design tool for database applications is the Access product which is available from Microsoft Corporation. Access allows a developer to define the structure of a database and to create forms with fields that are tied to fields in the database. To develop a form, the developer selects a table and fields from the table in the database to include in the form. However, Access does not show relationships between tables. The developer must be aware of the relationships that exist between tables in a database to design an application's interface. This requires that the application developer become knowledgeable as to the structure of the database. This is inefficient. Further, there is the possibility that an application developer will err in generating an interface that cannot accommodate the relationships that exist between the data to be displayed in fields in the interface.

SUMMARY OF THE INVENTION

Embodiments of the invention comprise a design tool for designing an application interface. The design tool includes a graphical user interface (GUI) that visually represents a hierarchy of data and the relationships between the data. Thus, the design tool eliminates the need for an interface designer to have independent knowledge of the structure of the data (i.e., the data fields and relationships between the data). The structure of the data is presented to the interface designer in the design tool's display.

The design tool's GUI represents the data and the relationships between the data in a hierarchical display referred to as a data palette. An output hierarchy comprised of output levels is created as the user selects fields from the data palette to be displayed in the application's interface. When a data field is selected, the design tool automatically determines the appropriate output level of the output hierarchy using the relationships defined for the data. The design tool further identifies an appropriate interface component within an output level for the selected field.

The design tool's GUI can optionally include a display that identifies the selected fields and the output levels created in the output hierarchy. Indentations in the display reflect the output levels. Further, the optional display identifies the type of interface component in which a selected field is included for review by the interface designer.

Output levels are associated with interface components that comprise the application's interface. Examples of interface components that can be used in the application's interface include a form, view and subband. Multiple interface components can be contained within a single output level. Interface components are comprised of interface objects such as text fields and buttons. A view is comprised of one or more lines, or bands, of information. Each band is comprised of one or more columns, or fields, of data. A subband is comprised of one or more columns of data.

An interface component can be nested within another interface component to display levels of detail in the data. For example, a subband can be nested within a view which is nested within a form. The design tool associates an interface component with an output level and displays the association in the design tool's GUI display.

The output hierarchy is created based on the data relationships that exist between the data that is selected by the user. A first level of the output hierarchy displays data from fields contained in a primary database table that is selected by the user. The level can further contain fields from tables that are related to the primary table via a one-to-one relationship or a many-to-one relationship. If the user selects a field from a table that is related to the primary table via a one-to-many relationship, the design tool creates another output level that is a child of the top-most output level. A link is automatically created between an interface component in the child and an interface component in the parent output level. The link can be used to perform operations on the data (e.g., update and retrieval operations).

An interface designer selects a database table as a primary table and an interface component for the first output level. The design tool generates a table hierarchy with the primary table as the root node. Nodes in the table hierarchy represent database tables and branches between the nodes represent the relationships between the tables.

The data palette can be generated using the table hierarchy. Initially, the data palette includes entries for the primary table, its fields, and its relationships with other tables. The user can expand (or reduce) a relationship to view a related table, its fields, and its relations.

When a field is selected in the data palette, embodiments of the invention traverse the table hierarchy to identify an output level for the selected field. If the selected field is contained within a table that is related to the primary table via a one-to-one or many-to-one relationship, the selected field can be added to the current output level. If the selected field is contained within a table that is related to the primary table via a one-to-many relationship, the selected field is added to a child output level of the primary table's output level. If the child output level is new, a link is automatically created between the primary table's output level and the related table. If necessary, an interface component is created within the child output level for the selected field.

BRIEF DESCRIPTION OF THE DRAWINGS

FIG. 3A provides an example of a view interface component according to an embodiment of the invention.

FIG. 3B provides an example of a form that contains a view interface component according to an embodiment of the invention.

DETAILED DESCRIPTION OF THE INVENTION

A method and apparatus for building an application interface is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Embodiment of Computer Execution Environment (Hardware)

Figure 1:
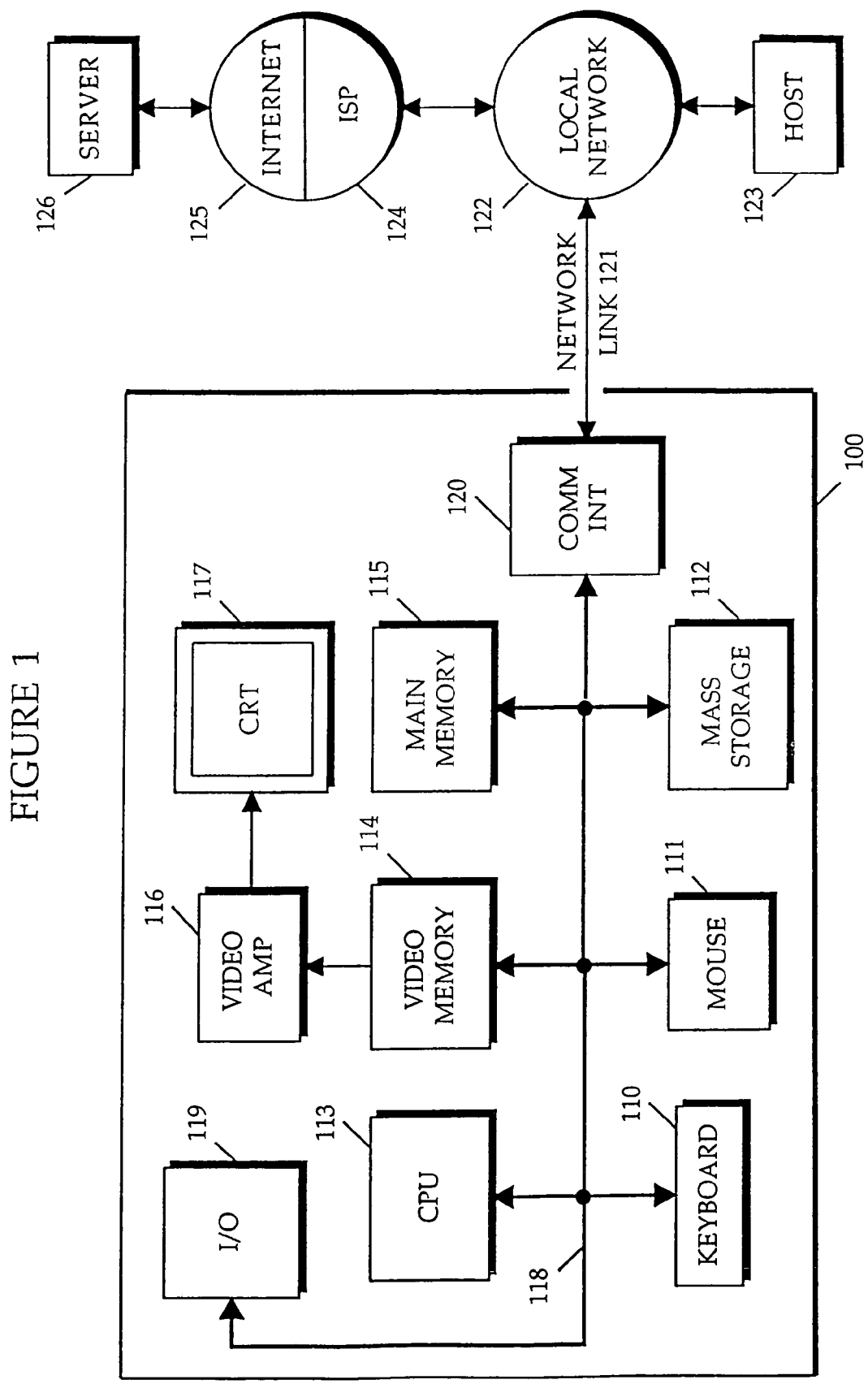
FIG. 1 provides an example of an embodiment of a computer execution environment suitable for executing embodiments of the invention.

An embodiment of the invention can be implemented as computer software in the form of computer readable code executed on a general purpose computer such as computer 100 illustrated in FIG. 1, or in the form of bytecode class files executable within a Java™ runtime environment running on such a computer. A keyboard 110 and mouse 111 are coupled to a bi-directional system bus 118. The keyboard and mouse are for introducing user input to the computer system and communicating that user input to processor 113. Other suitable input devices may be used in addition to, or in place of, the mouse 111 and keyboard 110. I/O (input/output) unit 119 coupled to bi-directional system bus 118 represents such I/O elements as a printer, A/V (audio/video) I/O, etc.

Computer 100 includes a video memory 114, main memory 115 and mass storage 112, all coupled to bi-directional system bus 118 along with keyboard 110, mouse 111 and processor 113. The mass storage 112 may include both fixed and removable media, such as magnetic, optical or magnetic optical storage systems or any other available mass storage technology. Bus 118 may contain, for example, thirty-two address lines for addressing video memory 114 or main memory 115. The system bus 118 also includes, for example, a 32-bit data bus for transferring data between and among the components, such as processor 113, main memory 115, video memory 114 and mass storage 112. Alternatively, multiplex data/address lines may be used instead of separate data and address lines.

In one embodiment of the invention, the processor 113 is a microprocessor manufactured by Motorola, such as the 680×0 processor or a microprocessor manufactured by Intel, such as the 80×86, or Pentium processor, or a SPARC™ microprocessor from Sun Microsystems™, Inc. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Alternatively, video memory 114 could be used to drive a flat panel or liquid crystal display (LCD), or any other suitable data presentation device. Video amplifier 116 is well known in the art and may be implemented by any suitable apparatus. This circuitry converts pixel data stored in video memory 114 to a raster signal suitable for use by monitor 117. Monitor 117 is a type of monitor suitable for displaying graphic images.

Computer 100 may also include a communication interface 120 coupled to bus 118. Communication interface 120 provides a two-way data communication coupling via a network link 121 to a local network 122. For example, if communication interface 120 is an integrated services digital network (ISDN) card or a modem or cable modem, communication interface 120 provides a data communication connection to the corresponding type of telephone line, which comprises part of network link 121. If communication interface 120 is a local area network (LAN) card, communication interface 120 provides a data communication connection via network link 121 to a compatible LAN. Wireless links are also possible. In any such implementation, communication interface 120 sends and receives electrical, electromagnetic or optical signals which carry digital data streams representing various types of information.

Network link 121 typically provides data communication through one or more networks to other data devices. For example, network link 121 may provide a connection through local network 122 to local server computer 123 or to data equipment operated by an Internet Service Provider (ISP) 124. ISP 124 in turn provides data communication services through the world wide packet data communication network now commonly referred to as the "Internet" 125. Local network 122 and Internet 125 both use electrical, electromagnetic or optical signals which carry digital data streams. The signals through the various networks and the signals on network link 121 and through communication interface 120, which carry the digital data to and from computer 100, are exemplary forms of carrier waves transporting the information.

Computer 100 can send messages and receive data, including program code, through the network(s), network link 121, and communication interface 120. In the Internet example, remote server computer 126 might transmit a requested code for an application program through Internet 125, ISP 124, local network 122 and communication interface 120.

The received code may be executed by processor 113 as it is received, and/or stored in mass storage 112, or other non-volatile storage for later execution. In this manner, computer 100 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Embodiments of the invention comprise a design tool for designing an application interface. The design tool includes a graphical user interface (GUI) that visually represents a hierarchy of data and the relationships between the data. That data can be, for example, data contained in fields of database tables. The relationships are, for example the relationships that exist between the tables in a database.

Embodiments of the invention are described with reference to data stored in a database management system (DBMS) such as a relational DBMS (RDBMS). However, it should be apparent that application of embodiments of the invention is not limited to data stored in a DBMS. A hierarchy can be represented from data stored in files in a file system, for example.

When fields are selected by the design tool user (i.e., user or designer) using the design tool, embodiments of the invention determine an output hierarchy that can be used to display the fields. The output hierarchy is comprised of output levels. Linkages are automatically generated between an interface component in a parent output level and an interface component in a child output level Further, a linkage can be generated between tables within the same interface component. A linkage can be used to operate on the data (e.g., update and retrieval operations).

The design tool eliminates the need for an interface designer to have an independent understanding of the structure of the data (i.e., the data fields and relationships between the data). The design tool's GUI represents the data and the relationships between the data in a hierarchical display referred to as a data palette. When a data field is selected, the design tool automatically determines the output hierarchy based on the data relationships.

The output hierarchy is created based on the data relationships that exist between the data that is selected by the user. A first output level of the output hierarchy contains an interface component that displays data from fields contained in a primary database table that is selected by the user. An output level's interface component can further contain fields from tables that are related to the interface component's primary table via a one-to-one relationship or a many-to-one relationship.

If the user selects a field from a table that is related to the primary table via a one-to-many relationship, the design tool identifies an interface component in a child output level of the first output level. The interface component within the child output level includes the selected field. If it does not already exist, a linkage is created between the interface component in the parent output level (i.e., the parent interface component) and the interface component in the child output level (i.e., the child interface component).

Figure 2A:
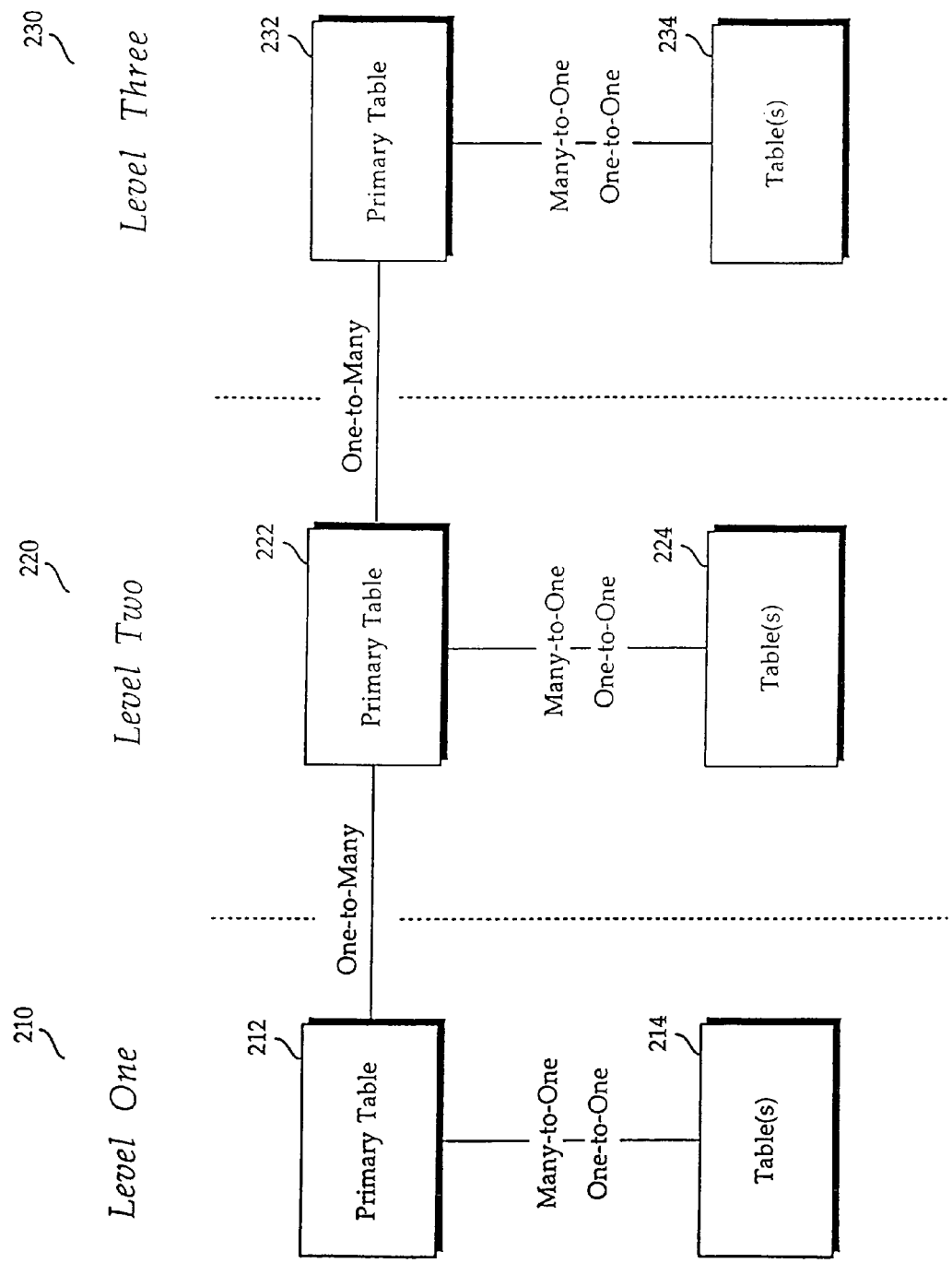
FIG. 2A illustrates output levels and the relationships according to an embodiment of the invention.

FIG. 2A illustrates output levels and the relationships according to an embodiment of the invention. Fields from primary table 212 are displayed in an interface component of output level 210. Tables 214 are related to primary table 212 via a many-to-one or one-to-one relationship. Fields in tables 214 are displayed in the interface component of output level 210 associated with primary table 212.

Fields from primary table 222 are displayed in an interface component in output level 220. Primary table 222 is associated with the interface component in output level 220. Primary table 222 is related to primary table 212 (which is associated with an interface component in output level 210) via a one-to-many relationship. Fields from tables 224 are related to primary table 222 via either a many-to-one or one-to-one relationship and are displayed in an interface component in output level 220. Similarly, primary table 232 is related to primary table 222 via a one-to-many relationship. Tables 234 are related to primary table 232 via either a many-to-one or one-to-one relationship. Fields contained in primary table 232 and tables 234 are displayed in an interface component of output level 230 which is the child interface component of a parent interface component in output level 220.

Figure 2B:
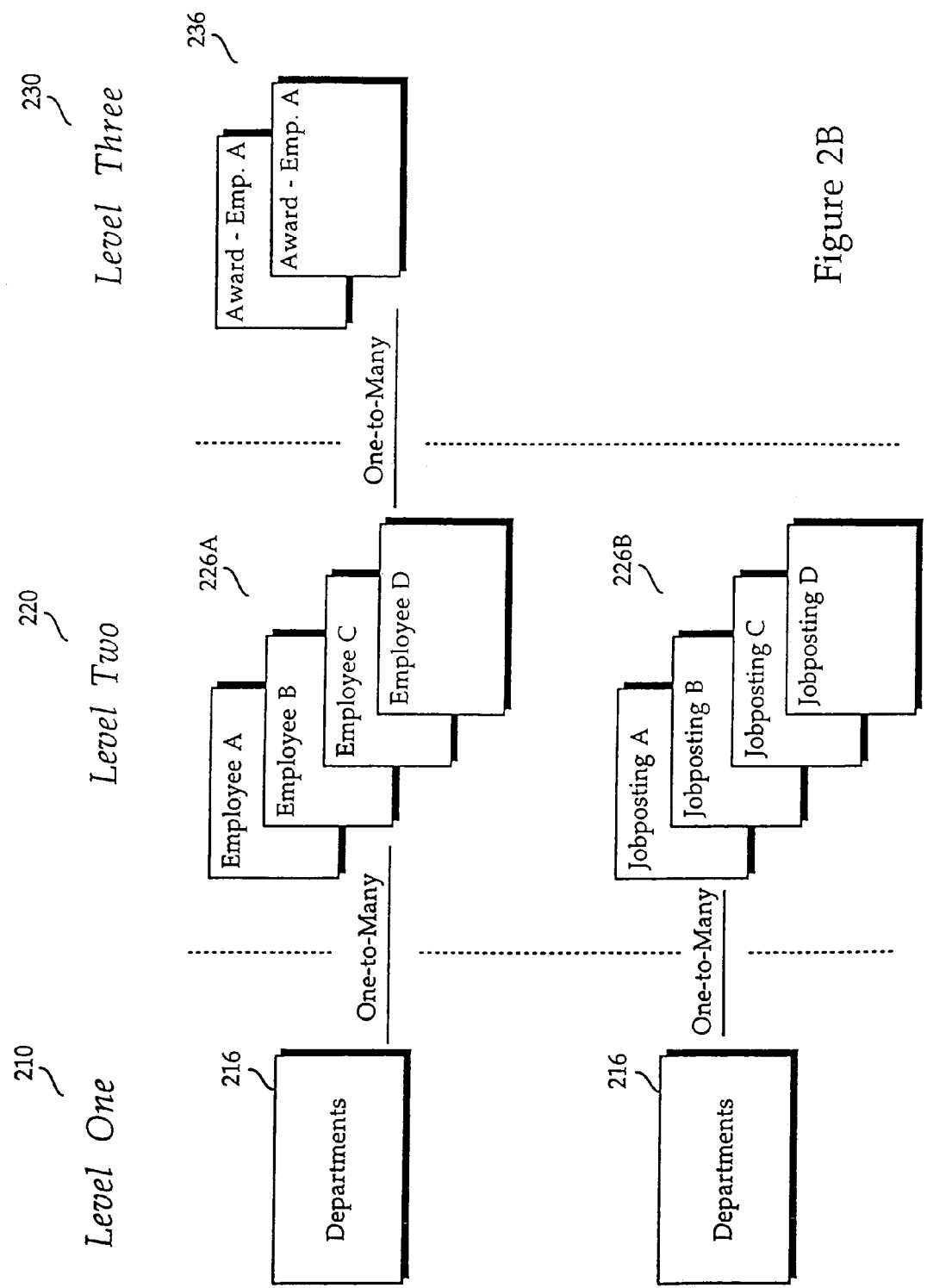
FIG. 2B provides sample data and their output levels according to an embodiment of the invention.

The output hierarchy created in embodiments of the invention can be used to display varying levels of detail associated with the data, for example. An interface component in a child output level can be used to display details associated with a field contained in an interface component in the parent output level, for example. FIG. 2B provides sample data and their output levels according to an embodiment of the invention.

Fields in a departments table are displayed in an interface component in output level 210. For example, the departments table can include a department identifier and a department name which are displayed in a departments interface component. A child interface component in output level 220 contains details associated with a department.

For example, output level 220 can contain an interface component that contains employee details for a department (i.e., an employees interface component). Output level 220 might further contain a second interface component that contains information identifying the jobs that are available in a certain department (i.e., a jobpostings interface component). Both the employees and jobpostings interface components in output level 220 are children of the department interface component that provide further details about a given department.

Output level 230 can be used to provide additional detail for the information contained in one of the interface components of output level 220. For example, output level 230 might contain an awards interface component (i.e., an interface component that contains information that identifies the awards given to an employee of a department) that provides further detail for a given employee displayed in the employees interface component.

In one embodiment of the invention, output levels contain one or more instances of a form, view and subband GUI interface components. Form, view and subband GUI interface components can be displayed in a window or panel of an application interface. A form, view and subband can include interface objects such as buttons, text fields, etc. Text fields can be used to display the data contained in fields of database tables, for example.

An interface component can be associated with one or more database tables. An interface component that is associated with a database table is referred to as a bound interface component. A bound interface component can include one or more interface objects that are bound to a data item (e.g., a field in a database table). For example, referring to FIG. 2B, output level 210 includes interface component 216 which may have interface objects displaying information contained in fields from the primary table associated with interface component 216. For example, interface component 216 may contain fields from and is bound to a departments table of a database. A field that is selected from the departments table for display in interface component 216 is bound to an interface object of interface component 216 that displays the field's data.

According to an embodiment of the invention, the form interface component is comprised of interface objects. A view interface component is comprised of lines, or bands, of information. A band is a collection of fields (e.g., text field interface objects) that display data in columns of a primary table, tables related to the primary table by a many-to-one or on-to-one relationship, or computed values based on other columns in the band or subbands of the band. A subband is a band whose primary table is related through a one-to-many relationship with the parent band's primary table.

Bands of a view can provide a hierarchical depiction of a set of fields from a set of records in a table. A field from a one-to-one or many-to-one related table is added as a column to the current band. A field from a one-to-many table causes a subband to be created, then the field is added as a column to that subband. Thus, a hierarchy of bands can be created for the view interface component.

To illustrate an output hierarchy, interface component 216 of output level 210 can be a form interface component. Interface components 226A and 226B of output level 220 can comprise views that include interface objects that contain information from columns in one or more database tables. The interface objects in the view (i.e., interface component 226A) contain information from an employees table, for example. There is a band of information for each employee in the department that is displayed in the form (i.e., interface component 216 of output level 210), for example. The second view in output level 220 (i.e., interface component 226B) can contain information from a jobpostings database table. Each band in the view contains information for a given jobposting (i.e., available job) with a department in the departments table.

Where interface components 226A and 226B of output level 220 are views, interface component 236 of output level 230 can be a subband interface component, for example. Where interface component 226A displays fields from the employees table, subband 236 can display fields of information that identify the awards given to a particular employee.

It should be apparent that while three output levels are illustrated in FIGS. 2A-2B, the number of output levels is not limited to three. Further, it should be apparent that the form, view and subband interface components can be nested in various ways. For example, output level 210 can include a form that contains another form, a subform, in output level 220. The subform can contain a subform (i.e., in output level 230), for example. Further, output level 220 can include a subform within a form and contain one or more views in output level 230, for example.

Figure 3B:
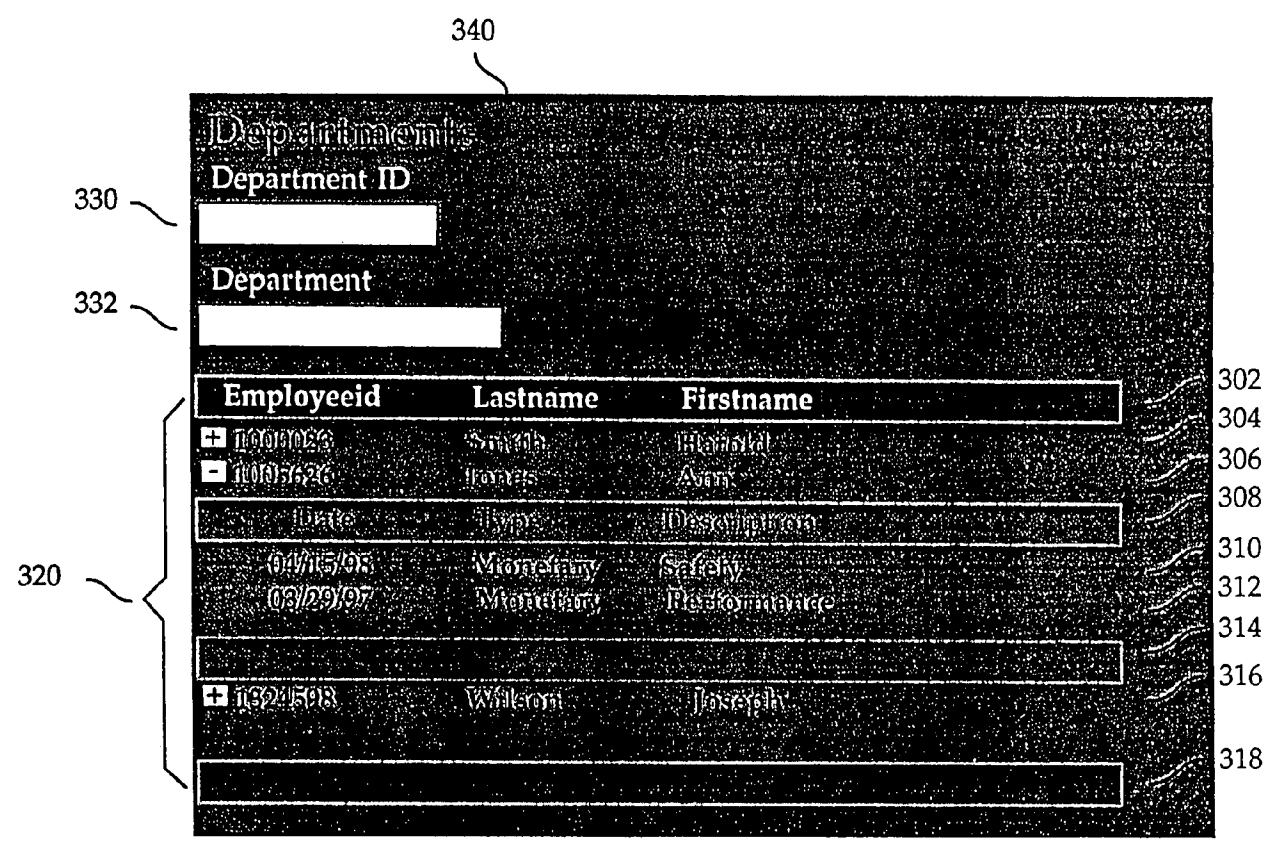
Figure 3C:
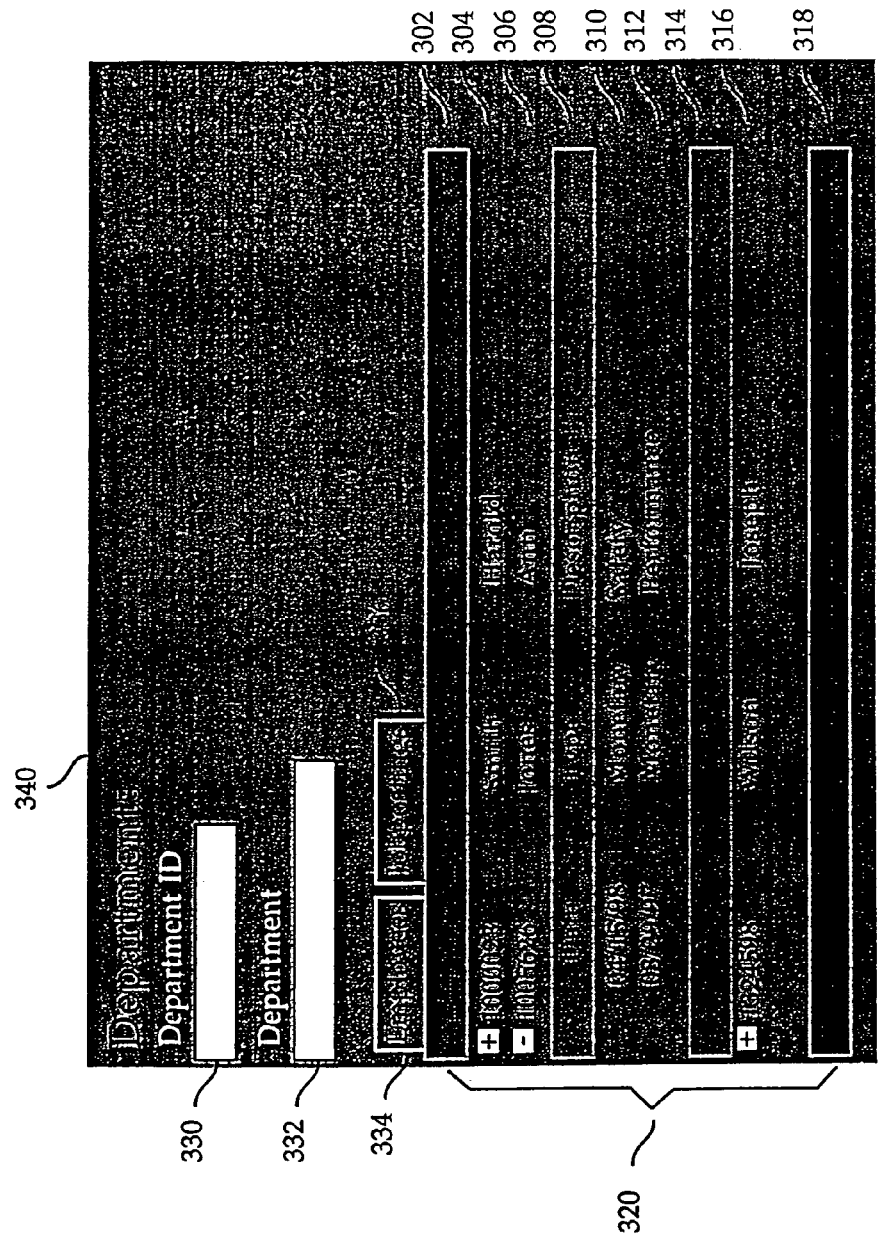
FIG. 3C provides an example of a form that contains two views according to an embodiment of the invention.

FIGS. 3A-3C provide examples of the form, view and subband interface components according to an embodiment of the invention. An example of a view interface component according to an embodiment of the invention is provided in FIG. 3A. View 320 is comprised of bands and subbands. For example bands 304, 306 and 316 contain employee information. Header 302 and footer 318 are associated with bands 304, 306 and 316. Header 302 contains fields headings for bands 304, 306 and 316. Bands 304, 306 and 316 contain employee information from the employeeid, lastname and firstname fields of an employees table.

Bands 310 and 312 are subbands of band 306. Header 308, footer 314 and bands 310 and 312 are displayed when the user selects icon 300. Icon 300 is used to expand (e.g., depicted with a "−" symbol in icon 300) or reduce (e.g., illustrated by a "+" symbol in icon 300) a subband interface component which is a child of a band. The user can expand a subband of a band and reduce the subband (i.e., remove it from the display) by selecting icon 300. While it is not shown in FIG. 3A, a scrolling capability can be provided where the information contained in view 320 exceeds its allocated display area.

FIG. 3B provides an example of a form that contains a view interface component according to an embodiment of the invention. Form 340 contains department information in interface objects 330 and 332 and view 320. View 320 contains employee information for a department currently being viewed in interface objects 330 and 332. Since there can be more than one employee in a department, a child interface component (e.g., view 320) is nested within form 340 to display the employee information. Bands 304, 306 and 316 display a department's employee information.

FIG. 3C provides an example of a form that contains two views according to an embodiment of the invention. Form 340 includes interface objects 330 and 332 to display department information. The views nested within form 340 are selectable via tabs 334 and 336. By selecting tab 334, the employee information associated with a department is displayed in form 340 (e.g., view 320). A view that contains jobposting information for a department can be displayed by selecting tab 336. View 320 is replaced by the jobposting view when tab 336 is selected, for example.

As discussed above, the design tool uses the relationships between data (e.g., tables and their fields) to determine the output levels and interface components within an output level given the fields that are selected by the user. In an RDBMS, two tables are related via fields in the tables that are typically referred to as keys. A field referred to as a primary key in one table is related to a field (e.g., a foreign key field) in a second table. A relationship type is identified as being a one-to-one, one-to-many or many-to-one relationship.

It should be apparent that various mechanisms can be used to specify data relationships. For example, where relationships are being defined for tables within a DBMS, a GUI can be provided that displays tables and the fields in each table. Using a define operation within the GUI, a user specifies a relationship between two tables by drawing a line between the two tables. The line connects the two tables' keys. The relationship type can be designated from a list of valid types in a pull-down menu, for example. The user can be prompted for a name to assign to the relationship. Alternatively, the relationship name can be generated from the names of the related tables.

Alternatively, relationships can be defined using a textual interface. For example, the user can specify the table names, the fields that are to be used as keys in the relationship, the relationship type and a relationship name in text fields in a text-based interface or a text-based editor.

Figure 4:
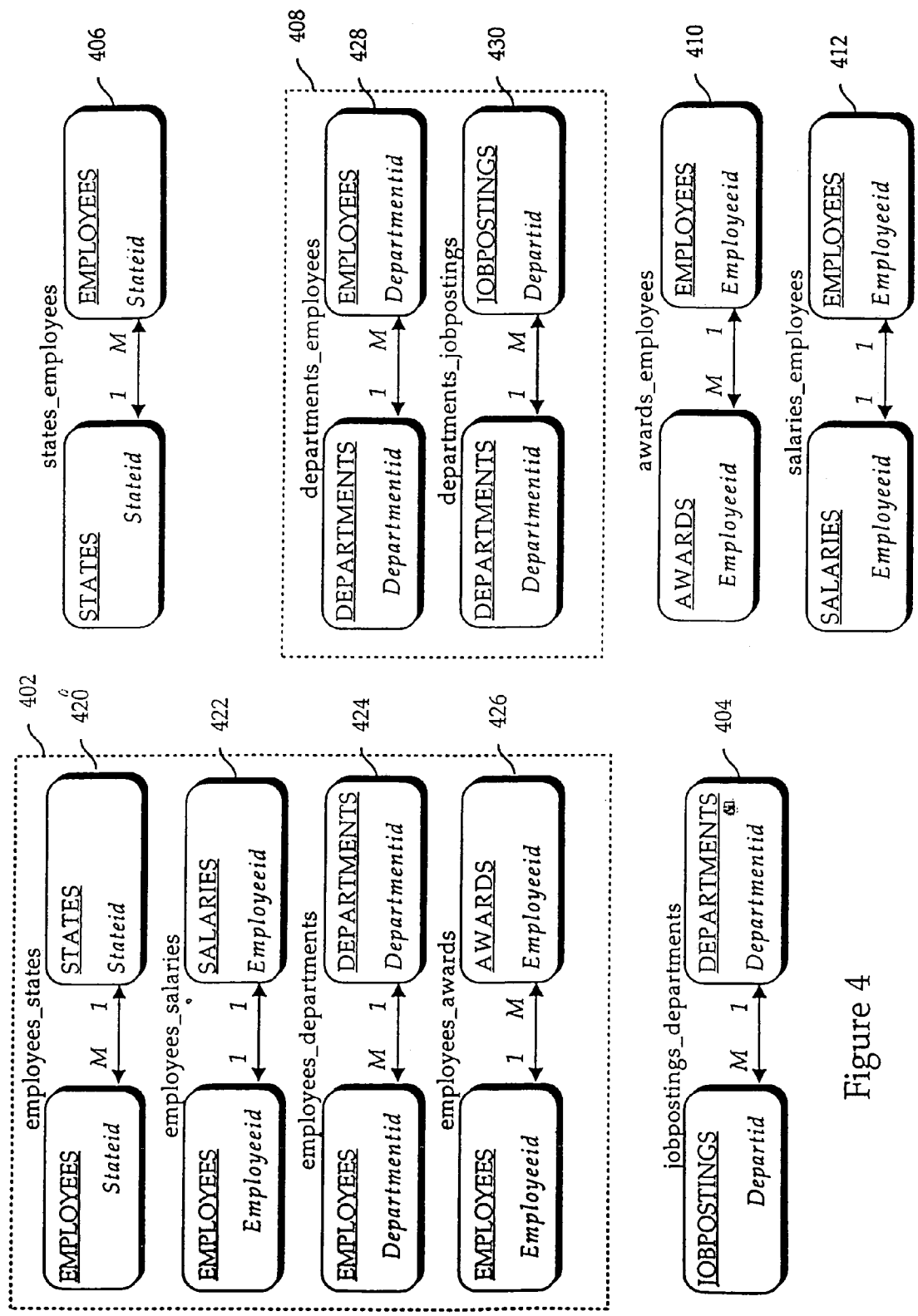
FIG. 4 provides a graphical illustration of the relationship information that is retained for database information according to an embodiment of the invention.

Information that is entered for a relationship is retained and used by the design tool. FIG. 4 provides a graphical illustration of the relationship information that is retained for database information according to an embodiment of the invention. According to this embodiment of the invention, each relationship has a relationship name, identifies the related tables and keys, and identifies a relationship type.

Relationships 402 identify the relationships for an employees table. Each relationship in relationships 402 has a name (e.g., employees_states for relationship 420, employees_salaries for relationship 422, employees_departments for relationship 424, and employees_awards for relationship 426). In addition to a relationship name, the names of the related tables, the related fields (e.g., the primary and foreign keys) and the relationship type are defined for each relationship. For example, the employees_states relationship (i.e., relationship 420) relates the employees and states tables via the stateid fields in each table. The relationship type is a many-to-one relationship. Similar information defines the employee_salaries, employee_departments, and employees_awards relationships (i.e., relationships 422, 424 and 426).

The employees_states relationship (i.e., relationship 420) defines a relationship between the employees and states tables relative to the employees table. A converse relationship exists for the states table (i.e., states_employees, relationship 406). While this relationship can be saved, it can also be derived from the employees_states relationship 420. Relationship 406 relates the states table to the employees table via the stateid fields in a one-to-many relationship.

Relationships 408 (i.e., relationships 428 and 430) relate the departments table with the employees table (i.e., the departments_employees relationship 428) and the jobpostings table (i.e., the departments_jobpostings relationship 430). Relationship 404 comprises the jobpostings_departments relationship between the jobpostings and departments tables via the departid field in the jobpostings table and the departmentid field in the departments table. The jobpostings_departments relationship is a many-to-one relationship. Similarly, relationships 410 and 412 define relationships between the awards and employees tables and the salaries and employees tables, respectively.

A table hierarchy is generated in embodiments of the invention to populate the data palette and determine the output levels and interface components for selected fields. The relationship information is used to build the table hierarchy.

Figure 5:
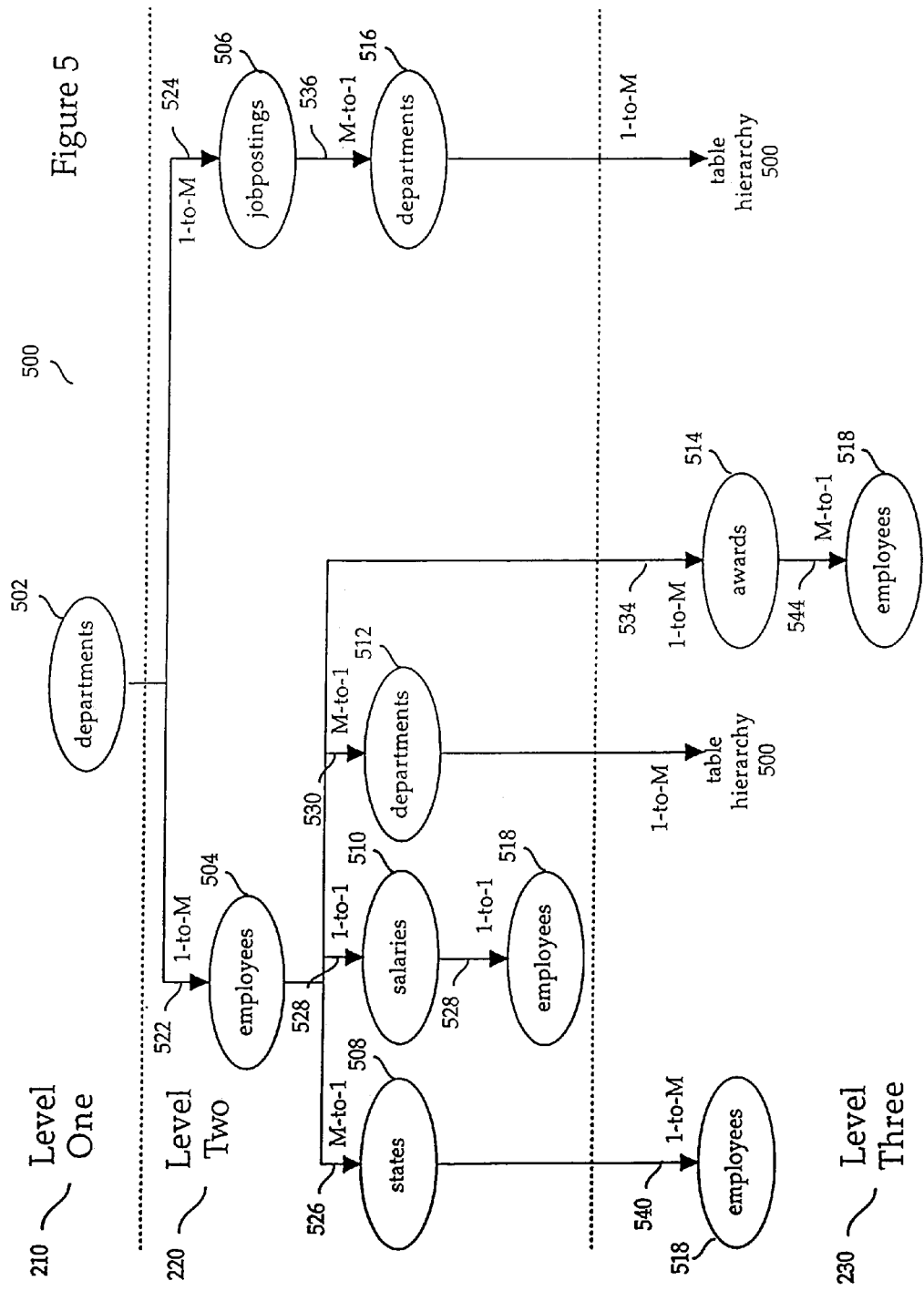
FIG. 5 illustrates a table hierarchy according to an embodiment of the invention depicting a departments table as the primary table and the relationships identified in FIG. 4.

A primary table selected by the user becomes the root node of the table hierarchy. The table relationships are used to define the remaining nodes of the table hierarchy. FIG. 5 illustrates a table hierarchy according to an embodiment of the invention depicting a departments table as the primary table and the relationships identified in FIG. 4.

Table hierarchy 500 is represented as a tree that contains nodes. Each node can have none or more child nodes. With the exception of the root node, each node can have a parent node. The lines that connect two nodes represents the relationship that exists between the tables that are represented by the nodes. Table hierarchy 500 is determined by the primary table selection and the direct and indirect relationships that are defined for the primary table. While a finite number of levels of table hierarchy 500 are illustrated in FIG. 5, it should be apparent that table hierarchy 500 can include an infinite number of hierarchical levels.

Node 502 is the root of table hierarchy 500 and represents the primary table (in this example, the departments table). Relationships 428 and 430 (i.e., the departments_employees and departments_jobpostings relationships) of FIG. 4 are represented as relationships 522 and 524 of FIG. 5. Nodes 504 and 506 are child nodes of node 502 and represent the employees and jobpostings tables, respectively.

Nodes 508, 510, 512 and 514 are child nodes of node 504 and represent the tables that are related to the employees table via relationships 420, 422, 424 and 426. Relationships 420, 422, 424 and 426 are represented as relationships 526, 528, 530 and 534, respectively. Nodes 508, 510 and 514 have node 518 as a child node. Relationships 540, 528 and 544 represent relationships 406, 412 and 410 of FIG. 4, respectively.

Beginning with node 518, the branch of table hierarchy 500 beginning with node 504 is repeated (i.e., node 518 is node 504 in the repetition). The hierarchy associated with nodes 512 and 516 are the same as table hierarchy 500 with nodes 512 and 516 being node 502 of table hierarchy 500.

Node 516 is a child node of node 506 and represents the departments table that is related to the jobpostings table (via relationship 404 of FIG. 4 which is represented as relationship 536 of FIG. 5). Nodes 506 and 516 represent the jobpostings and departments tables, respectively. Table hierarchy 500 is repeated with node 516 being node 502.

Data Palette

Figure 6:
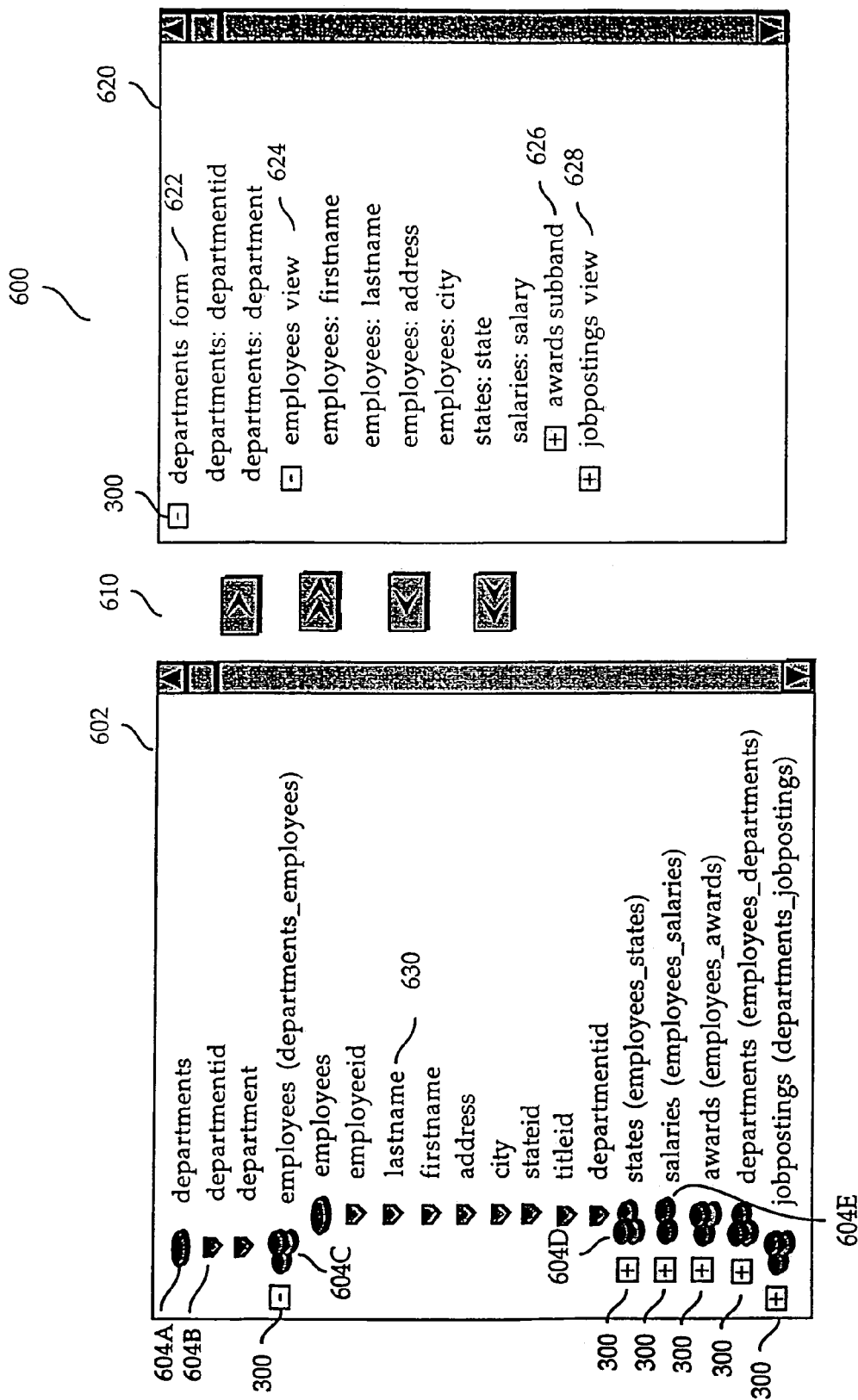
FIG. 6 provides an example of a data palette according to an embodiment of the invention.

The design tool includes a data palette according to one or more embodiments of the invention that displays tables, fields within tables and relationships between tables. The contents of the data palette are generated based on the primary table selection and its related tables. Table hierarchy 500 is used to generate the data palette in one or more embodiments of the invention. FIG. 6 provides an example of a data palette according to an embodiment of the invention.

GUI 600 of a design tool includes data palette 602. Data palette 602 includes table, field and relationship entries. Icons 604A-604E provide information about its associated entry. For example, icons 604A and 604B identify an entry as a table entry or a field entry, respectively. Icons 604C-604E identify an entry as a relationship and the type of the relationship. Icon 604C indicates that the relationship is a one-to-many relationship. For example, icon 604C indicates that the departments and employees tables are related in a one-to-many relationship. That is, there can be multiple employees that work for a given department.

Icon 604D represents a many-to-one relationship. For example, the employees table is related to the states table via a many-to-one relationship. That is, there can be multiple employees that live in a given state. Icon 604E represents a one-to-one relationship. An employee record in the employees tables has a single salary record in the salary table.

In an embodiment of the invention, the primary table is represented as the first entry in data palette 602. The fields of the primary table are displayed in entries below the primary table entry. The relationships associated with the primary table are also displayed below the primary table entry.

A relationship can be expanded or reduced using icon 300. When the relationship is expanded, icon 300 displays a "−" symbol. Conversely, when a relationship is reduced, icon 300 depicts a "+" symbol.

Data palette 602 can be included in a design tool (e.g., a wizard) that is used to build an application's interface. The user can scroll through the entries in data palette 602 and select the fields to be included in an interface component such as a form, view or subband. The user identifies an interface component (e.g., form, view or subband) that is being built using the design tool. Embodiments of the invention determine the output level and interface component for the fields that are selected in data palette 602. That is, when a field is selected, embodiments of the invention determine the output level and interface component within the output level for the field. For example, a form interface component can be created in a design tool from fields selected from data palette 602.

Optionally, GUI 600 can further include display 620 that identifies the fields that have been selected from data palette 602 and the output levels for each selected field. Display 620 includes interface component entries (e.g., "departments form") and field entries (e.g., "departments: departmentid"). Interface component entries can include icon 300 to expand or reduce the display associated with the entry (e.g., expanding or reducing the display of field entries associated with an interface component entry).

Interface component entries are indented to indicate the output level for the interface component. For example, entry 622 is not indented which indicates that the departments form is in output level 210. The employees and jobpostings view interface components are indented once to indicate that they are included in output level 220. Entry 626 is indented twice to illustrate that the awards subband interface component is in output level 230.

An interface component entry (e.g., entries 622, 624, 626 and 628) identifies the primary table for the interface component (e.g., "departments") and the interface component (e.g., "form"). A field entry identifies the selected field (e.g., "departmentid") and the table (e.g., "departmentid") that contains the selected field.

Assuming that the departments table is selected as the primary table, table hierarchy 500 is created with node 502 representing the departments table. The departments_employees and departments_jobpostings relationships are represented by relationships 522 and 524 (respectively) of table hierarchy 500. Nodes 504 and 506 represent the tables directly related to the departments table (i.e., the employees and jobpostings tables). Nodes 508, 510, 512, 514 and 516 represent tables that are related to the departments table via the employees or jobpostings tables.

Table hierarchy 500 is used, in embodiments of the invention, to generate the entries for data palette 602. Data palette 602 includes fields from the departments table and the departments table's relationships. The departments_employees relationship is expanded in data palette 602 such that the fields and relationships of the employees table can be viewed in data palette 602.

Buttons 610 of GUI 600 can be used to initiate an add or remove operation. The buttons containing arrows pointing to the right (i.e., ">" and ">>") move a field or fields to an interface component within an output level. The design tool determines the output level and the interface component of the output level for the selected field or fields. The field (or fields) is added to display 620 under the appropriate interface component entry. The buttons containing arrows that point to the left (i.e., "<" and "<<") remove a field or fields from an interface component within an output level and display 620. For example, to move a single field to an interface component of an output level and display 620, the field is selected in data palette 602 and the right single arrow (">") button is selected. To remove a single field from an interface component of an output level and display 620, the field is selected in display 620 and the left single arrow ("<") button is selected.

As a field is selected from data palette 602, an output level and interface component within the output level are determined for the selected field. If a new output level is needed, the output level and an interface component entry are determined and depicted in display 620. The output level for the new interface component entry is indicated by indenting the entry, if necessary. The field is added beneath the interface component entry in display 620. If the interface component entry already exists, the selected field is added as an entry beneath the interface component entry in display 620.

If selected, primary table fields (e.g., departmentid and department fields of the departments table) are added to the interface component of output level 210. If a form is being created, the form is added to output level 210 and the selected primary table fields are added to the form, for example. Interface objects are created in the form to display the departmentid and department data.

Selected fields from tables that are related in a one-to-one or many-to-one relationship with the primary table can be added to the primary table's interface component. Selected fields from a table that is related in a one-to-many relationship with the primary table are added to a child output level (e.g., output level 220 where the primary table's interface component is in output level 210). Fields from tables that are related to the primary table of an interface component in output level 220 via a one-to-one or many-to-one relationship can be added to that same interface component in output level 220.

Display 620 includes four interface components within three output levels. That is, display 620 includes a form, two views contained within the form and a subband within one of the views. To determine the output level for a selected field, embodiments of the invention traverse table hierarchy 500 beginning with the root node and ending with the table that includes the selected field. An output level is associated with the root node (i.e., node 502) of table hierarchy 500. The output level changes when a one-to-many relationship is encountered while traversing table hierarchy 500. When the selected field's table in table hierarchy 500 is reached, the current output level is the output level for the selected field.

A determination is made whether an interface component exists for the selected field. If the selected field's table caused the transition to the current output level, the table is a primary table. If an interface component is associated with the primary table, the selected field is added to the primary table's interface component at the current output level. If the selected field's table is related to the primary table that caused the transition to the current output level via a one-to-one or many-to-one relationship, the selected field is added to the interface component for the primary table.

To illustrate, output level 210 is associated with the departments table. The departments table is the primary table for an interface component in output level 210. If entry 630 of data palette 602 is selected, table hierarchy 500 is traversed beginning with node 502 and ending with node 504. Node 504 is reached from node 502 via relationship 522. Relationship 522 is a one-to-many relationship. Therefore, the output level is changed to output level 220. Since node 504's relationship with node 502 causes the transition to output level 220, the table associated with node 504 is the primary table for an interface component in output level 220. Since entry 630 represents a field within the employee's primary table, the selected field (i.e., the lastname field of the employees table) is included in the employee's interface component in output level 220.

If output level 210 is a form interface component, for example, the lastname field of the employees table is placed in a view interface component of output level 220. If output level 210 is a view interface component, the lastname field of the employees table is placed in a subband interface component of output level 220, for example.

FIG. 5 illustrates the placement of nodes within output levels 210, 220 and 230. As the primary table for output level 210, departments table fields are included in a departments interface component in output level 210. In this example, output level 220 contains two interface components. The employees and jobpostings tables (i.e., nodes 504 and 506) are related to the departments table via one-to-many relationships. Therefore, fields selected from the employees and jobpostings tables are included in employees and jobpostings interface components of output level 220. The employees table is the primary table for employees interface component. The jobpostings table is the primary table for the jobpostings interface component.

Nodes 508, 510 and 512 represent tables that are related to the employees table via either a one-to-one or a many-to-one relationship. Fields selected from these tables can be included in output level 220 and the employees interface component. Node 514 represents a table (i.e., the awards table) that is related to the employee table via a one-to-many relationship. Thus, fields selected from this table are included in an awards interface components (i.e., an interface component whose primary table is the awards table) in output level 230.

Linkage

Relationships are used to link interface components in parent and child output levels. Further, relationships can be used to join tables whose fields are included in an output level's interface component. A link can be used for retrieval and/or update operations. For example, referring to FIG. 5, relationship 522 is used to link output levels 210 and 220. Referring to FIG. 4, relationship 428 indicates that the departments and employees tables are related via the departmentid fields in each table. Thus, the linkage between output levels 210 and 220 can be expressed as:

departments.departmentid=employees.departmentid

The linkage can be used as the criteria to select a record (or records) that are related to a record in the parent level. For example, an employees view can be populated by the records in the employees table whose departmentid field matches the departmentid field of the departments record displayed in a form containing the view. In a relational DBMS, the linkage can be used to generate a where clause for a SQL statement (e.g., select or update).

The linkage can further be used as the criteria (e.g., part of an SQL Where clause) for a join between tables whose fields are contained within the same output level (e.g., fields from more than one table that are related to an interface component's primary table via a many-to-one relationship). For example, a link can be used to join the employees table and the departments table to select fields from both tables where the employees.departmentid for a record in the employees table is equal to the departments.departmentid for a record in the departments table. The result of the join returns an employee's department information.

Process Flow Example

Figure 7A:
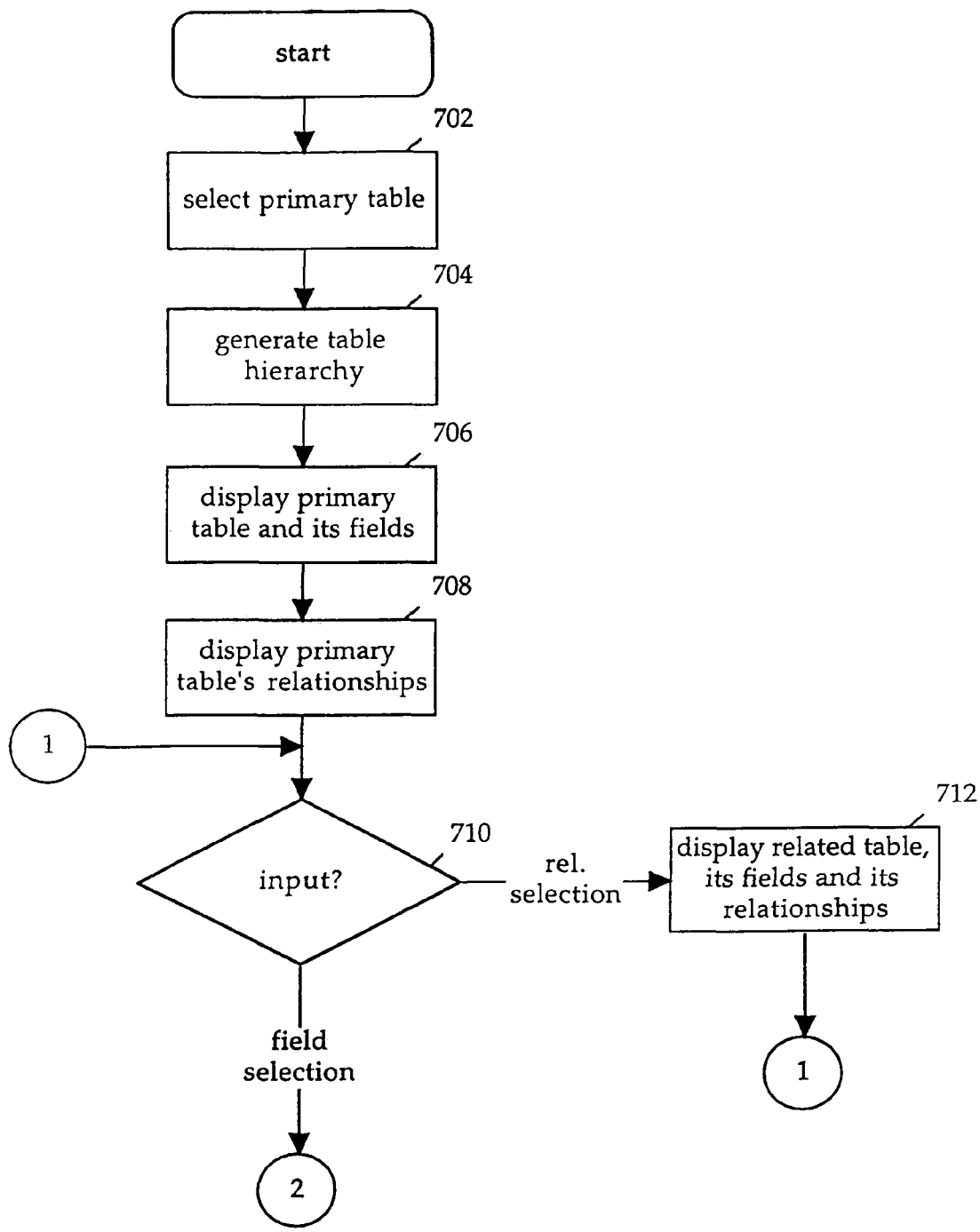
FIGS. 7A-7B provide a design tool process flow according to an embodiment of the invention.
Figure 7B:
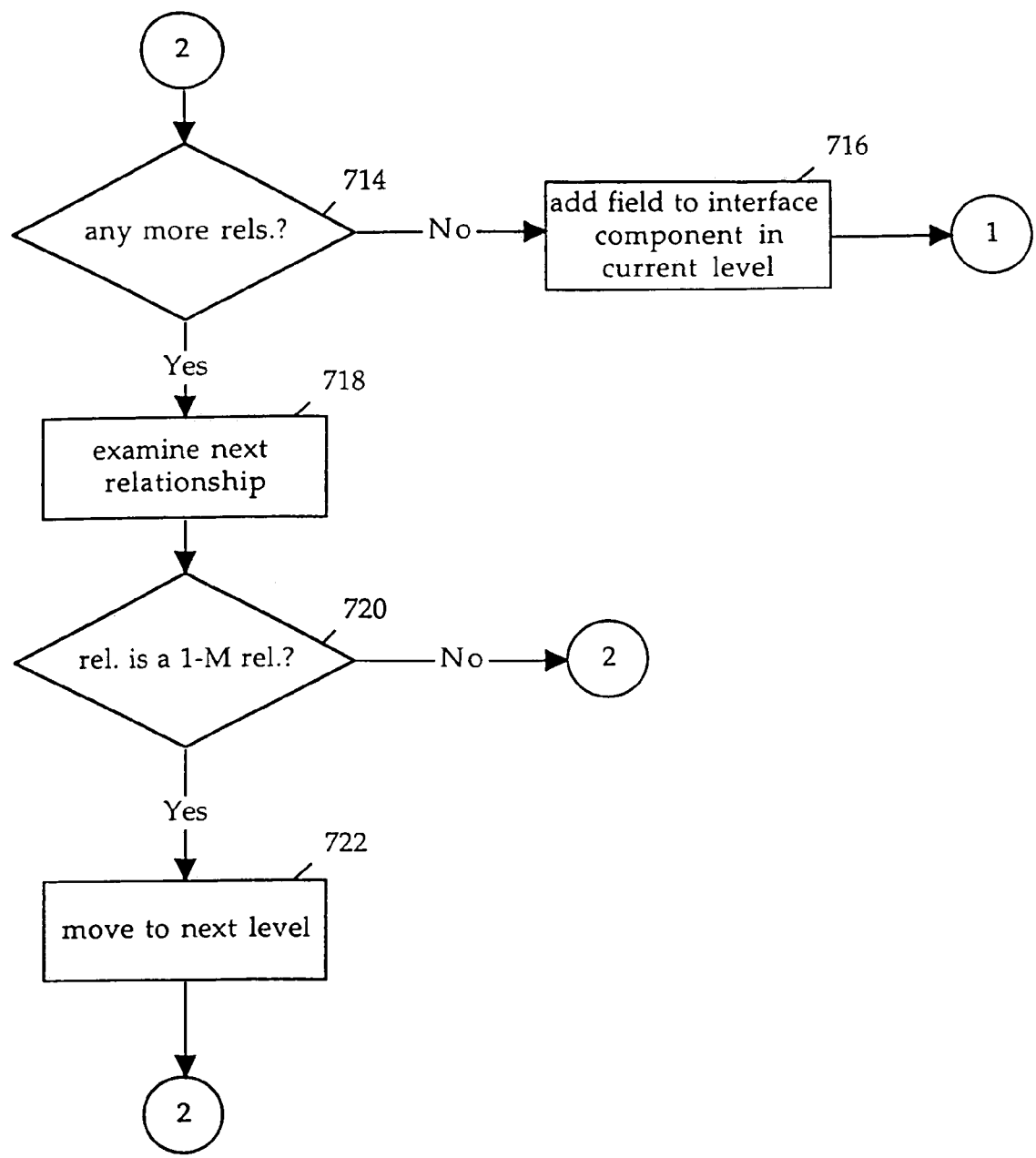

Embodiments of the invention use data palette 602 for user selection of fields for inclusion in an interface component. Interface objects, or fields, contained within an interface component are bound to selected data fields. A link can be created between parent and child output levels and within a given output level. A primary table is identified for each interface component of an output level. FIGS. 7A-7B provide a design tool process flow according to an embodiment of the invention.

At step 702, a primary table is selected. The primary table is associated with an interface component in output level 210. For example, referring to node 502 of table hierarchy 500, the departments table becomes the primary table for output level 210. The relationships associated with the primary table, the tables that are directly or indirectly related to the primary table and their relationships are used to generate table hierarchy 500 at step 704. At step 706, the primary table and its fields are displayed as entries in data palette 602. At step 708, the primary table's relationships are displayed in data palette 602.

At step 710, a determination is made whether input is received from GUI 600. If a relationship entry is selected in data palette 602, processing continues at step 712 to display the related table along with its fields and relationships in data palette 602.

If it is determined at step 710, that a field entry of data palette 602 is selected, processing continues at step 714 (of FIG. 7B). Beginning with step 714, table hierarchy 500 is traversed to determine the output level and interface component for the selected field. At step 714, a determination is made whether there are any more relationships to examine in table hierarchy 500. If not, processing continues at step 716 to add the selected field to an interface component in the current output level.

If it is determined, at step 714, that there are more relationships, processing continues at step 718 to examine the next relationship. If it is determined, at step 720, that the relationship is not a one-to-many relationship, processing continues at step 714 to examine any remaining relationships in table hierarchy 500.

If it is determined, at step 720, that the relationship is a one-to-many relationship, processing continues at step 722 to make the current output level's child output level the current output level. Processing continues at step 714 to examine any remaining relationships.

At step 716, the field is added to an interface component in the current output level. The parent output level can be used to determine the type of interface component used for the child output level. For example, if the output interface type associated with the parent output level is a form, the output interface type associated with the new output level is a view. Similarly, if, for example, the associated output interface type associated with the parent output level is a view, the new output level is a subband.

A primary table is associated with an interface component. As discussed above, the primary table is the table that caused the transition to the child output level. A link is created between the parent output level's interface component and the child output level's interface component. The selected field is added to the interface component.

Thus, a method and apparatus for building an application interface has been provided in conjunction with one or more specific embodiments. The invention is defined by the claims and their full scope of equivalents.

The invention claimed is:

1. A computer implemented method of building an application having one or more user interface components for hierarchically displaying a primary data table having a set of data fields stored at a relational database and providing an indication of relationships between one or more data fields stored at the relational database comprising:

obtaining hierarchical display information from the relational database regarding the set of data fields associated with the primary data table and relationships defined for said data fields;

creating a hierarchical display that displays at least the set of data fields associated with the primary data table and relationships defined for said data fields;

selecting from said hierarchical display at least one data field of said set of data fields;

assigning a selected one of said data fields to at least one of the one or more user interface components;

generating an output hierarchy using said relationships to automatically provide a plurality of output levels, the plurality of output levels comprising at least one user interface component for displaying at least one data field having a relationship with said selected data field within said set of data fields; and displaying said output hierarchy, wherein each of said plurality of output levels displays a level of detail associated with said selected data field.

2. The method of claim 1 wherein one or more of said relationships obtained from the relational database comprise a many-to-one relationship.

3. The method of claim 1 wherein one or more of said relationships obtained from the relational database comprise a one-to-one relationship.

4. The method of claim 1 wherein said assigning a selected one of said data fields is performed automatically.

5. The method of claim 1 wherein said interface component comprises a form.

6. The method of claim 1 wherein said interface component comprises a view.

7. The method of claim 1 wherein said interface component comprises a subband.

8. The method of claim 1 wherein said generating an output hierarchy using said relationships step further comprises traversing a table hierarchy to identify one of said plurality of output levels for said selected data field.

9. The method of claim 1 wherein at least one of said plurality of output levels comprises a child output level associated with the primary table output level.

10. A computer implemented system for building an application having one or more user interface components for hierarchically displaying a primary data table having a set of data fields stored at a relational database and providing an indication of relationships between one or more data fields stored at the relational database comprising:

computer readable medium encoded with a computer program configured to cause a computer device to obtain hierarchical display information from the relational database regarding the set of data fields associated with the primary data table and relationships defined for said data fields;

computer readable medium encoded with a computer program configured to cause a computer device to create a hierarchical display that displays the set of data fields associated with the primary data table and relationships defined for said data fields;

computer readable medium encoded with a computer program configured to allow a user to select from said hierarchical display at least one data field of said set of data fields;

computer readable medium encoded with a computer program configured to cause the computer device to assign a selected one of said data fields to at least one of the one or more user interface components;

computer readable medium encoded with a computer program configured to cause the computer device to generate an output hierarchy using said relationships to automatically provide a plurality of output levels, each of said plurality of output levels comprising at least one interface component for displaying at least one data field having a relationship with said selected data field within said set of data fields; and computer readable medium encoded with a computer program configured to cause the computer device to display said output hierarchy, wherein each of said plurality of output levels displays a level of detail associated with said selected data field.

11. The system of claim 10 wherein one or more of said relationships obtained from the relational database comprise a many-to-one relationship.

12. The system of claim 10 wherein one or more of said relationships obtained from the relational database comprise a one-to-one relationship.

13. The system of claim 10 wherein said computer code configured to cause the computer device to assign a selected one of said data fields is configured to perform said assignment automatically.

14. The system of claim 10 wherein said interface component comprises a form.

15. The system of claim 10 wherein said interface component comprises a view.

16. The system of claim 10 wherein said interface component comprises a subband.

17. The system of claim 10 wherein said computer code configured to cause a computer to generate an output hierarchy using said relationships further comprises computer readable program code configured to cause a computer to traverse a table hierarchy to identify on of said plurality of output levels for said selected data field.

18. The system of claim 10 wherein at least one of said plurality of output levels comprises a child output level associated with the primary table output level.

* * * * *